(12) United States Patent
Ito

(10) Patent No.: US 7,488,438 B2
(45) Date of Patent: Feb. 10, 2009

(54) MOLDING MACHINE AND CONTROL METHOD THEREOF

(75) Inventor: Akira Ito, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 11/117,507

(22) Filed: Apr. 29, 2005

(65) Prior Publication Data

US 2005/0191379 A1 Sep. 1, 2005

Related U.S. Application Data

(63) Continuation of application No. PCT/JP03/14003, filed on Oct. 31, 2003.

(30) Foreign Application Priority Data

Oct. 31, 2002 (JP) ............................ 2002-317023

(51) Int. Cl.
B29C 45/76 (2006.01)
(52) U.S. Cl. .................... 264/40.1; 264/255; 264/328.8
(58) Field of Classification Search ............... 264/40.1, 264/40.5, 40.7, 255, 328.8
See application file for complete search history.

(56) References Cited

U.S. PATENT DOCUMENTS

| | | | |
|---|---|---|---|
| 4,318,874 A * | 3/1982 | Lemelson | ................... 264/40.1 |
| 4,878,824 A | 11/1989 | Hara | |
| 5,202,611 A | 4/1993 | Uehara et al. | |
| 5,362,222 A | 11/1994 | Faig et al. | |
| 5,492,658 A * | 2/1996 | Ohno et al. | ................ 264/40.1 |
| 5,667,737 A * | 9/1997 | Wittmann | ................... 264/40.1 |
| 5,792,483 A * | 8/1998 | Siegrist et al. | ............... 425/135 |
| 6,142,760 A | 11/2000 | Niizeki et al. | |
| 6,183,235 B1 * | 2/2001 | Taniguchi et al. | ........... 425/139 |

FOREIGN PATENT DOCUMENTS

| | | |
|---|---|---|
| EP | 0 890 426 A2 | 1/1999 |
| EP | 0 952 504 A2 | 10/1999 |
| EP | 1 044 764 A2 | 10/2000 |
| JP | 11-56030 | 6/1989 |
| JP | 01-247128 | 10/1989 |
| JP | 3-82390 | 4/1991 |
| JP | 06-063989 | 3/1994 |
| JP | 9-39052 | 2/1997 |
| JP | 10-113966 | 6/1998 |
| JP | 10-264218 | 10/1998 |
| JP | 11-305839 | 11/1999 |
| JP | 2001-079877 | 3/2001 |
| JP | 2001-225345 | 8/2001 |
| JP | 2002-79556 | 3/2002 |
| JP | 2002-137269 | 5/2002 |
| JP | 2004-17488 | 1/2004 |
| WO | WO 00/21729 | 4/2000 |

* cited by examiner

*Primary Examiner*—Jill L Heitbrink
(74) *Attorney, Agent, or Firm*—Squire, Sanders & Dempsey L.L.P.

(57) ABSTRACT

A molding machine according to the present invention includes a plurality of drive mechanisms driven by servo motors and a controller for controlling the respective drive mechanisms. According to the present invention, the plurality of drive mechanisms are divided into at least two groups. At least one of the two groups includes a plurality of drive mechanisms to be synchronized. The controller controls the at least two groups while establishing synchronization among the drive mechanisms included in the at least one of the two groups.

20 Claims, 8 Drawing Sheets

MOLDING MACHINE AND CONTROL METHOD THEREOF

REFERENCE TO RELATED APPLICATION

This application is a continuation of the PCT International Application No. PCT/JP2003/014003 filed on Oct. 31, 2003, which is based on the Japanese Application No. 2002-317023 filed on Oct. 31, 2002.

BACKGROUND OF THE INVENTION

The present invention relates to a molding machine having a plurality of drive mechanisms driven by servo motors and a control method of the molding machine. The present invention is suitable for an injection molding machine and a molding machine, for example, a two-material or two-color molding machine including a plurality of drive-mechanisms of the same type.

A motor-driven injection molding machine will be explained with reference to FIG. 1. The motor-driven injection molding machine includes a motor-driven injection device driven by servo motors. In the motor-driven injection device, a screw is moved forward and rearward by converting the rotational motion of the servo motor into a linear motion by for example, a ball screw and a nut.

In FIG. 1, the rotation of an injection servo motor 51 is transmitted to a ball screw 52. A nut 53 is fixed to a pressure plate 54 and moved forward and rearward by the rotation of the ball screw 52. The pressure plate 54 can move along a guide bar 56 fixed to a base frame 55. Although a plurality of guide bars are ordinarily provided, only one guide bar is shown here. The forward and rearward movement of the pressure plate 54 is transmitted to a screw 60 through a bearing, a load cell (any of them is omitted), and an injection shaft 57. The screw 60 is disposed so that it can rotate in a heating cylinder 61 and moves in an axial direction. A resin supply hopper 62 is disposed to the heating cylinder 61 corresponding to the rear portion of the screw 60. The rotational motion of a metering servo motor 63 is transmitted to the injection shaft 57 through a coupling member such as a belt, a pulley, and the like to rotate the screw 60. That is, the screw 60 is rotated by driving the injection shaft 57 in rotation by the rotation servo motor 63.

The heating cylinder 61 having the screw 60 disposed therein and the hopper 62 are called a plasticizing device. Although the plasticizing device is ordinarily locked to the base frame 55, when the device is unlocked, it can be moved forward and rearward in the axial direction of the screw 60 by a motor 58.

Next, a motor-driven mold clamping device driven by servo motors will be explained. The motor-driven mold clamping device has a fixed platen 72 having a fixed mold 71 attached thereto, a plurality of tie-bars 73, and a movable platen 75 having a movable mold 74 attached thereto. The motor-driven mold clamping device further has two arms 76 whose one ends are coupled with the movable platen 75, a toggle support 77, a mold clamping servo motor 78, a ball screw 79, a cross head 80 having a ball nut threaded with the ball screw 79, and the like.

The rotational motion of the servo motor 78 is converted into the linear motion of the cross head 80 through the ball screw 79. The linear motion of the cross head 80 is converted into the forward and rearward motion of the movable platen 75 through a toggle mechanism composed of the cross head 80, toggle levers 81a and 81b, and the arms 76. When the movable platen 75 travels forward, causes the movable mold 74 to come into contact with the fixed mold 71 and further travels forward, the tie-bars 73 are extended and generate mold clamping force. Reference numeral 82 denotes a molded product eject motor.

The toggle support 77 is ordinarily locked to the fixed platen 72 through the tie-bars 73 also in the mold clamping device. However, when the toggle support 77 is unlocked, an element including a toggle mechanism, and the movable platen 75 can be moved in a mold open/close direction by a mold thickness adjust motor 83.

As can be understood from the above description, in the motor-driven injection molding machine, a servo-controlled drive mechanism includes four drive mechanisms, that is, an injection drive mechanism 91, a metering rotation drive mechanism 92, an ejector drive mechanism 93, and a mold opening/closing drive mechanism 94 as shown in FIG. 2. Note that these drive mechanisms may be called drive shafts. In any case, each of the drive mechanisms is composed of a servo motor as a drive unit and a servo controller as a drive controller, for example, DSP (digital signal processor) for controlling the servo motor.

In general, an injection molding machine makes a molded product through a plurality of processes of metering process—mold closing process—injection process—mold clamping process—dwelling process—mold opening process—eject process.

Heretofore, the data such as the drive command values, the detected values, and the like of the injection drive mechanism 91, the metering rotation drive mechanism 92, the ejector drive mechanism 93, and the mold opening/closing drive mechanism 94 are transmitted from the respective servo controllers thereof to the servo controllers of all the other drive mechanisms through a main controller 90 as an overall controller. The detected values detected by the detectors, which are attached to the drive units constituting the drive mechanisms or attached to driven units driven by the drive units, are input to the servo controllers as drive controllers. The servo controllers calculate the differences between the command values from the main controller 90 and the detected values input thereto and control the drive units based on the differences. The main controller 90 is realized by, for example, CPU (central processing unit). Heretofore, the main controller 90 controls the four drive shafts to establish synchronization among them at a four axis control processing speed.

For example, the data are transmitted from the metering rotation drive mechanism 92, the ejector drive mechanism 93, and the mold opening/closing drive mechanism 94 to the injection drive mechanism 91 through the main controller 90 at all times according to the processing speed of the main controller 90 to establish synchronization. In contrast, the data is transmitted from the injection drive mechanism 91 to the main controller 90. That is, the detected value of the injection drive mechanism is transmitted to the other three drive mechanisms through the main controller 90 at all times, thereby a synchronous control is executed such that drive timings are correctly in coincidence with each other among the four drive mechanisms. This is also the same as to the other three drive mechanisms.

Next, a two-material molding machine will be explained with reference to FIGS. 3 to 6. Note that it can be assumed that a two-color molding machine has the same arrangement as that of the two-material molding machine. Ordinarily, the two-material molding machine has two injection devices mounted on a frame with respect to one mold clamping device shown in FIG. 1 and molds a plurality of molded products by respective cavities of front and rear sides. FIGS. 3-6 show only the arrangement of the two-material molding machine in the vicinity of a mold thereof.

In FIG. 3, reference numeral 121 denotes a fixed platen, 122 denotes a movable platen moved forward and rearward by a mold opening/closing drive mechanism (not shown). The fixed platen 121 has a fixed mold 123 attached thereto, and the movable platen 122 has a movable mold 124 attached thereto through a reversing device 125. Reference numeral 128 denotes a first heating cylinder for melting a resin as a first material, and reference numeral 129 denotes a second heating cylinder for melting a resin as a second material. Ordinarily, the first heating cylinder 128 is called a front side, and the second heating cylinder 129 is called a rear side. It is needless to say that the type of the first material resin is different from that of the second material resin. The first molten resin material and the second molten resin material are injected from a first injection nozzle 130 and a second injection nozzle 131, respectively and fill the cavities formed between the fixed mold 123 and the movable mold 124.

A molding operation will be executed as described below. On the first heating cylinder 128 side, the first molten resin material injected from the first injection nozzle 130 fills the cavity and molds a first molded product portion 135. On the second heating cylinder 129 side, the second molten resin material injected from the second injection nozzle 131 fills the cavity and molds a second molded product portion 136 on the surface of the first molded product portion 135 molded by the previous shot.

Subsequently, as shown in FIG. 4, the mold opening is executed, and a sprue runner 138 is removed from the first molded product portion 135 on the first heating cylinder 128 side. In contrast, on the second heating cylinder 129 side, a molded product 137 composed of the first molded product portion 135 and the second molded product portion 136 is ejected from the mold.

Next, as shown in FIG. 5, the movable mold 124 is reversed by the reversing device 125, thereby the first molded product portion 135 is moved from the first heating cylinder 128 side to the second heating cylinder 128.

Subsequently, as shown in FIG. 6, the mold closing and the mold clamping are executed, and, on the first heating cylinder 128 side, the first molten resin material injected from the first injection nozzle 130 fills the cavity and a first molded product portion 135 is molded. In contrast, on the second heating cylinder 129 side, the second molten resin material injected from the second injection nozzle 131 fills the cavity, and a second molded product portion 136 is molded on the surface of the first molded product portion 135 molded by the previous shot.

As apparent from the above description, a multi-material or multi-color molding machine includes the same type of a plurality of drive mechanisms. The two-material or two-color molding machine has injection drive mechanisms, metering rotation drive mechanisms, and ejector drive mechanisms provided on front and rear sides, respectively. A mold opening/closing drive mechanism and a reversing drive mechanism are used commonly on the front and rear sides. Accordingly, the two-material or two-color molding machine includes the eight drive mechanisms.

When it is intended to realize the synchronous control of the eight drive mechanisms by a single main controller, a highly performance main controller having a high processing speed is required to establish synchronization among the eight drive mechanisms at a processing speed satisfying the performance of the two-material or two-color molding machine, which increases a cost. That is, when eight axes are synchronized with each other simultaneously by the single main controller, a highly performance main controller having a high processing speed is required.

In contract, a multi-material or multi-color molding machine using two main controllers is proposed to control front and rear sides, respectively. In this case, a third main controller is further required to synchronize front and rear side drive mechanisms with each other, thereby a cost is increased.

SUMMARY OF THE INVENTION

Accordingly, an object of the present invention is to provide a molding machine and a control method of the same which can realize, even if many drive mechanisms exist as in a molding machine, a synchronous control among the respective drive mechanisms by a main controller having a minimum processing speed and a minimum processing capability.

In other words, the present invention is to control the molding operation of a molding machine having drive mechanisms more than an arbitrary number of previously selected drive mechanisms by a main controller having such a degree of processing capability that it can control the arbitrary number of the drive mechanisms.

A control method according to the present invention is applied to a molding machine having a plurality of drive mechanisms driven by drive units and a controller for controlling the respective drive mechanisms. According to the control method of the present invention, the plurality of drive mechanisms are divided into at least two groups. The controller executes synchronization among the drive mechanisms included in at least one group of the at least two divided groups of the drive mechanisms and executes control to the at least two divided groups.

A molding machine according to the present invention is provided with a plurality of drive mechanisms driven by drive units and a controller for controlling the respective drive mechanisms. According to the present invention, the plurality of drive mechanisms are divided into at least two groups. At least one group of the at least two groups includes a plurality of drive mechanisms to be synchronized. The controller controls the at least two groups while establishing synchronization among the drive mechanisms included in the at least one group.

According to the present invention even if many drive mechanisms are provided, they can be controlled by a single main controller having a low processing speed without using a highly performance main controller.

DESCRIPTION OF THE PREFERRED EMBODIMENT

Figure 1:
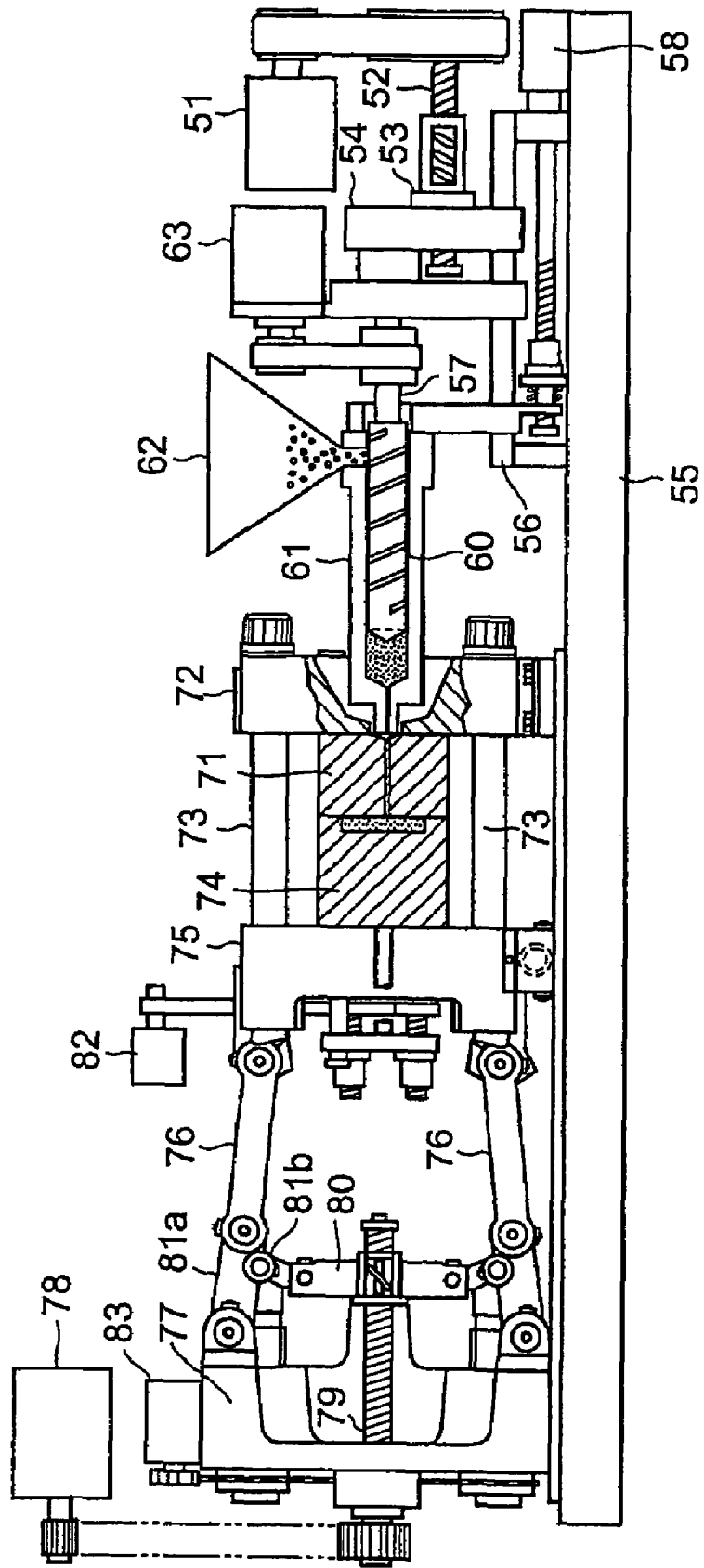
FIG. 1 is a view explaining the structure of an ordinary motor-driven injection molding machine.

A first embodiment of a control method according to the present invention will be explained with reference to FIG. 7. In the first embodiment, the present invention is applied to the two-material or two-color molding machine explained in FIGS. 3 to 6. When the control method according to the present invention is applied to the two-material or two-color molding machine, a main controller must control a front side injection drive mechanism 11A, a front side metering rotation drive mechanism 12A, a front side ejector drive mechanism 13A, and a front side mold opening/closing drive mechanism 14A so that synchronization is established among them in order to realize synchronization among all the molding processes in a front side molding machine. In contrast, in a rear side molding machine, the main controller must also control a rear side injection drive mechanism 11B, a rear side metering rotation drive mechanism 12B, a rear side ejector drive mechanism 13B, and a reversing drive mechanism 14B so that synchronization is established among them in order to realize synchronization among all the molding processes. However, the front side molding processes are separated from the rear side molding processes by a process of reversing a mold and the like. Accordingly, it is not always necessary to establish strict synchronization between the front side and the rear side by transmitting the data such as the drive command values, the detected values, and the like of one side to the other side.

Thus, the main controller 10 controls the injection drive mechanism 11A, the metering rotation drive mechanism 12A, the ejector drive mechanism 13A, and the mold opening/closing drive mechanism 14A on the front side so that synchronization is established among them as well as controls the injection drive mechanism 11B, the metering rotation drive mechanism 12B, the ejector drive mechanism 13B, and the reversing drive mechanism 14B on the rear side so that synchronization is established among them. That is, in the first embodiment, two groups A and B of drive mechanisms are set as the combinations of drive mechanisms which are to be synchronized with each other. That is, the eight drive mechanisms (eight axes) driven by servo motors are divided into the two groups each including four drive mechanisms (four axes). That is, to execute a synchronous control among the four drive mechanisms, the detected values of the respective four drive mechanisms are transmitted to the other three drive mechanisms through the main controller 10 at all times to thereby cause the timings of drive of the respective drive mechanisms to be correctly in coincidence with each other.

When the drive mechanisms to be synchronized with each other are divided into the two groups, the number of the drive mechanisms to be synchronized with each other is reduced to 4. As a result, the amount of data to be transmitted through the main controller 10 is greatly reduced, thereby the processing speed of the main controller 10 may be sufficiently smaller than that of the highly performance main controller for synchronizing the eight axes described above. This is because it is sufficient for the main controller 10 to have a processing speed for controlling the four axes. In contrast, since the drive mechanisms (in particular, the injection drive mechanism and the metering rotation drive mechanism), which are to be synchronized with each other, are synchronized in parallel in the respective groups, even the four-axis control main controller can meet the required performance of a molding machine. That is, synchronization can be established among the eight-axis drive mechanisms at the four-axis processing speed which meets the performance of the two-material or two-color molding machine.

Figure 7:
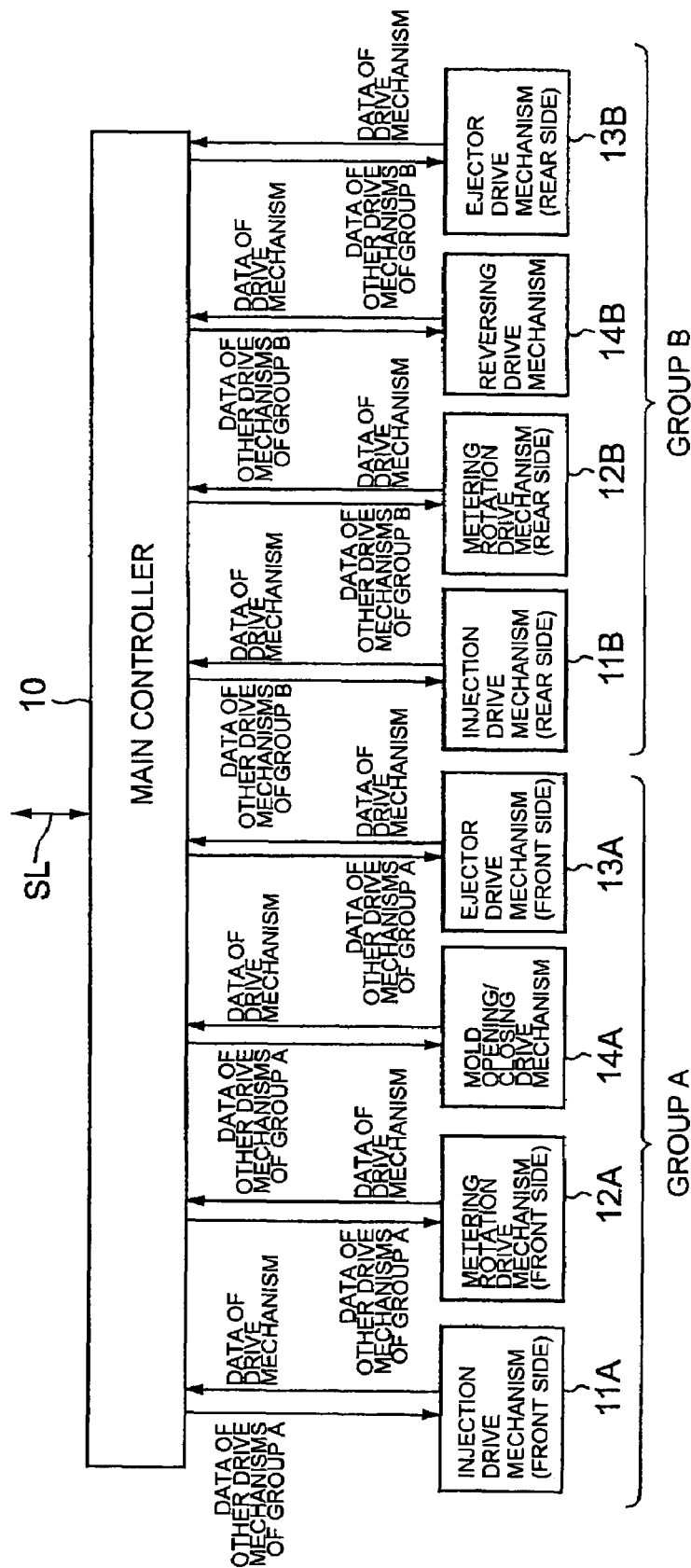
FIG. 7 is a block diagram showing the arrangement of a control system when a control method according to the present invention is applied to a two-material or two-color molding machine.

FIG. 7 shows only the arrangement in which the main controller 10 is connected to the plurality of drive mechanisms. Actually, however, the main controller 10 has, for example, a data input unit (not shown), detected signal lines from the sensors other than the sensors included in the illustrated drive mechanisms, and the output units (not shown) of a printer, a display, and the like connected thereto, respectively. For the sake of convenience, the signal lines for the above arrangements are collectively shown by a single signal line SL in FIG. 7. This is also applied to FIGS. 10 and 11 described later.

Incidentally, the molding machine may be added with two or more drive mechanisms which must be synchronized, in addition to the injection drive mechanism, the metering rotation drive mechanism, the mold clamping drive mechanism, and the ejector drive mechanism. Even in this case, these drive mechanisms are divided into the first group including the injection-drive mechanism, the metering rotation drive mechanism, the mold clamping drive mechanism, and the ejector drive mechanism and the second group including the other two or more drive mechanisms. The main controller executes a synchronous control among the first group of the drive mechanisms as well as among the second group of the other two or more drive mechanisms. When the main controller is applied to an ordinary injection molding machine, that is, to an injection molding machine having an injection drive mechanism, a metering rotation drive mechanism, a mold clamping drive mechanism, and an ejector drive mechanism, the main controller executes the synchronous control among the four drive mechanisms, that is, among the injection drive mechanism, the metering rotation drive mechanism, the mold clamping drive mechanism, and the ejector drive mechanism. In contrast, when the main controller is applied to a molding machine other than the ordinary injection molding machine, for example, to a two-material or two-color molding machine, the main controller executes the synchronization control as explained in FIG. 7. This means that the main controller can use almost the same software installed therein in any of the ordinary injection molding machine and the injection molding machines other than it for use in the control executed by the main controller. In other words, when the main controller 10 explained in FIG. 7 is applied to the ordinary injection molding machine, it is sufficient to set the installed software such that it executes no control to the B group.

Next, explanation will be made as to the present invention applied to a case in which all the drive mechanisms need not be synchronized in all the molding processes. First, a second embodiment will be explained in which the present invention is applied to control an injection device at a metering process. In this case, the present invention can be also applied to an injection molding machine having each one set of a mold clamping device and an injection device, in addition to the two-material molding machine described above.

In the metering process, the number of revolutions of a screw of an injection device must be changed according to a position of the screw. In particular, to control the number of revolutions of the screw to 0 (rpm) at a metering process finished position, strict synchronization must be established at least between only an injection drive mechanism and a metering rotation drive mechanism. Accordingly, in the metering process, it is not necessary to establish synchronization between an ejector drive mechanism and a mold clamping drive mechanism, and it is sufficient to establish accurate synchronization at least between the injection drive mechanism and the metering rotation drive mechanism to cause the timings thereof to be in coincidence with each other. Thus, the main controller controls the injection drive mechanism and the metering rotation drive mechanism so that they are synchronized with each other in the metering process separately from the other drive mechanisms. As a result, since the load of the main controller can be reduced in the metering process, even a main controller having a low processing speed can sufficiently achieve a function.

In the embodiment shown in FIG. 7, the injection device is controlled in the metering process as described below. For example, on the front side, it is sufficient to establish synchronization between only the injection drive mechanism 1A and the metering rotation drive mechanism 12A. In contrast, on the rear side, it is sufficient to establish synchronization between the injection drive mechanism 11B and the metering rotation drive mechanism 12B in the metering process. Accordingly, the main controller 10 may execute a synchronous control at least between the injection drive mechanism 11A and the metering rotation drive mechanism 12A in the metering process on the front side and at least between the injection drive mechanism 1B and the metering rotation drive mechanism 12B in the metering process on the rear side. This is also the same in the embodiments to be described later.

Next, a third embodiment of the present invention will be explained. The third embodiment can be also applied to an injection molding machine having each one set of set of a mold clamping device and an injection device, in addition to the two-material injection molding machine described above. In the control method of the injection molding machine, the machine is ordinarily controlled such that respective processes are continuous to each other as shown by metering process—mold closing process—injection process—mold clamping process—dwelling process—mold opening process—eject process as described above. However, when a molded product having a thin thickness and the like are molded, an injection/compression process may be executed by combining the mold clamping process with a filling process. In the injection/compression process, a resin is injected into the cavity of a mold which is previously opened by an amount called a compression margin. Then, the resin is compressed by closing the mold before the cavity is completely filled with the resin. Thereafter, the resin is cooled and solidified by being continuously compressed. In the injection/compression process, a mold opening/closing drive mechanism and an injection drive mechanism are controlled as described below. First, after the movable mold is reached to a predetermined position by the mold opening/closing drive mechanism, the cavity thereof is filled with the resin by the injection drive mechanism, and thereafter the resin filling the cavity is compressed by driving the mold opening/closing drive mechanism in correspondence to the control of the injection drive mechanism.

As described above, at the injection/compression process, the ejector drive mechanism and the mold opening/closing drive mechanism must be controlled in correspondence with each other. Accordingly, in the injection/compression process, it is not necessary to control, for example, the ejector drive mechanism and the metering rotation drive mechanism, which are other than the injection drive mechanism and the mold opening/closing drive mechanism, to establish synchronization therebetween, and it is sufficient to accurately synchronize at least the injection drive mechanism with the mold opening/closing drive mechanism so that the timings thereof are in coincidence with each other. Accordingly, a main controller causes the injection drive mechanism and the mold opening/closing drive mechanism to belong to the group which is subjected to the synchronous control in the injection/compression process and can control them separately from the other drive mechanisms. As a result, since the load of the main controller can be reduced in the injection/compression process, even a main controller having a low processing speed can sufficiently achieve a function.

Next, a fourth embodiment of the present invention will be explained. The fourth embodiment will be applied to the case in which an operation for projecting an eject pin into the cavity of a mold is executed while the cavity is being filled with a resin in an ejector drive mechanism. This operation is called an ejector projection control during injection. The fourth embodiment can be also applied to an injection molding machine having each one set of set of a mold clamping device and an injection device, in addition to the two-material injection molding machine described above likewise the second embodiment.

An ejector projection control executed in injection will be explained. The eject pin is projected into the cavity in the state in which the mold have been closed. When the cavity is filled with the resin, the eject pin is moved back by the pressure of the resin. Although the resin filling the cavity is cooled and solidified, the eject pin continuously presses the resin in the cavity while it is being cooled and solidified. That is, the resin in the cavity is kept constant even if it is contracted by being cooled because it is continuously pressed by the eject pin. As a result, a defect such as shrinkage does not occur in a molded product. When this operation is executed, an ejector drive mechanism must be synchronized with an injection drive mechanism at least in a filling process and a dwelling process. Accordingly, in the ejector projection control executed in injection, it is not necessary to control, for example, a mold opening/closing drive mechanism and a metering rotation drive mechanism, which are other than the injection drive mechanism and the ejector drive mechanism, to establish synchronization therebetween, and it is sufficient to accurately synchronize at least the injection drive mechanism with the ejector drive mechanism so that the timings thereof are in coincidence with each other. Accordingly, in the ejector projection control executed in injection, a main controller causes the injection drive mechanism and the ejector drive mechanism to belong to the group which is subjected to the synchronous control and can control them separately from the other drive mechanisms in an injection process. As a result, since the load of the main controller can be reduced in the injection process, even a main controller having a low processing speed can sufficiently achieve a function.

Next, a fifth embodiment of the present invention will be explained. The fifth embodiment is applied to the case in which an eject pin is projected in a mold opening process. The fifth embodiment can be also applied to an injection molding machine having each one set of set of a mold clamping device and an injection device, in addition to the two-material injection molding machine described above. The eject pin projection control operation is executed in the mold opening process to reduce a molded product ejecting time by projecting the eject pin before the mold is completely opened. As a result, a molding cycle time is reduced. When this operation is executed, an ejector drive mechanism must be synchronized with a mold opening/closing drive mechanism in the mold opening process and an eject process. Accordingly, in the eject pin projection control operation executed in the mold opening process, it is not necessary to control, for example, an injection drive mechanism and a metering rotation drive mechanism, which are other than the ejector drive mechanism and the mold opening/closing drive mechanism, to establish synchronization therebetween, and it is sufficient to accurately synchronize at least the ejector drive mechanism with the mold opening/closing drive mechanism so that the timings thereof are in coincidence with each other. Accordingly, in the eject pin projection control operation executed in the mold opening process, a main controller causes the ejector drive mechanism and the mold opening/closing drive mechanism to a group which is subjected to the synchronous control and can control them separately from the other drive mechanisms. As a result, since the load of the main controller can be reduced in the mold opening process, even a main controller having a low processing speed can sufficiently achieve a function.

Incidentally, in this type of the injection molding machine, a single drive mechanism may be driven by two servo motors.

Figure 8A:
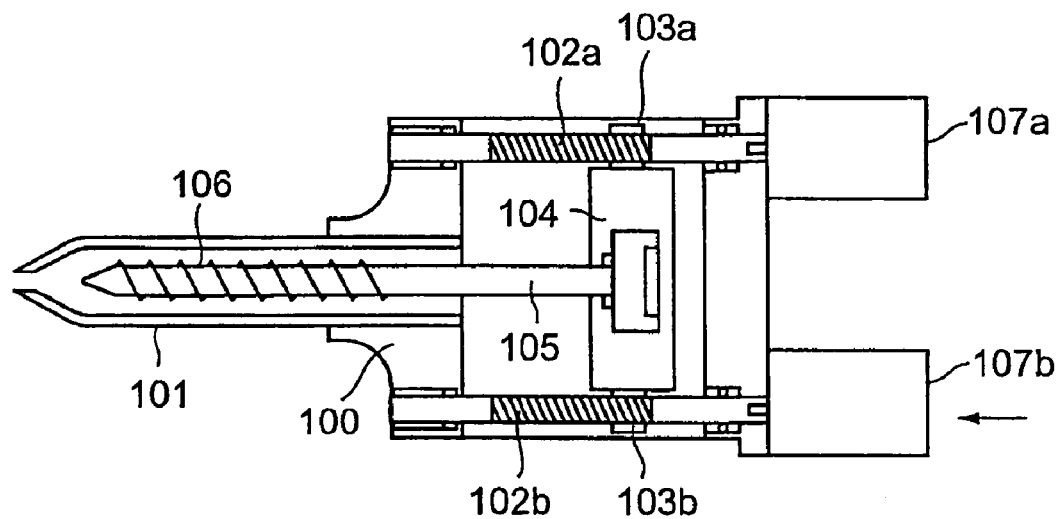
FIGS. 8A and 8B are a partly sectional plan view and a partly sectional side elevational view explaining an example in which an injection drive mechanism is driven by two servo motors.
Figure 8B:
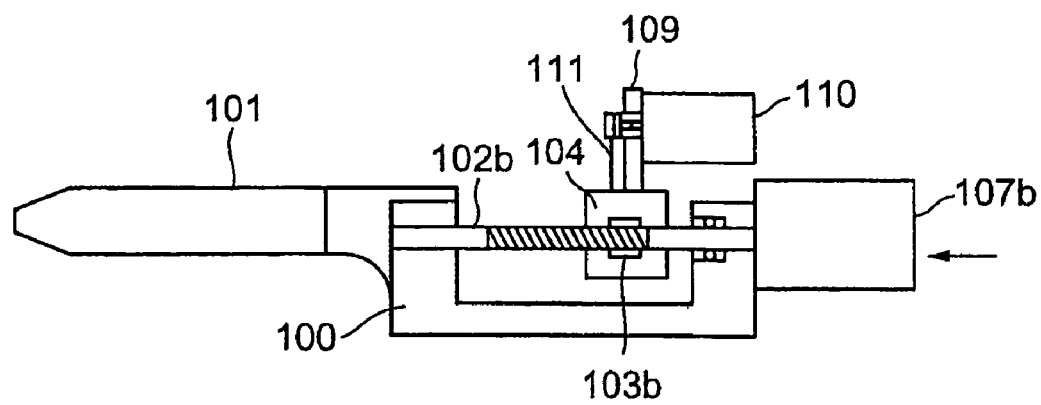

FIGS. 8A and 8B show an example in which an injection drive mechanism is driven by two servo motors. In FIG. 8A, a cylinder cabinet 100 having a heating cylinder 101 has ball screws 102a and 102b rotatably supported thereby. A screw support member 104 is supported by the ball screws 102a and 102b through nuts 103a and 103b. An injection shaft 105 is rotatably attached to the screw support member 104. The injection shaft 105 has a screw 106 coupled therewith and extending in the heating cylinder 101. The cylinder cabinet 100 has injection servo motors 107a and 107b disposed on the outer wall surface thereof. The ball screws 102a and 102b are coupled with the rotation shafts of the injection servo motors 107a and 107b, respectively.

In FIG. 8B, the screw support member 104 has an attachment member 109 disposed thereto and extending upward. The attachment member 109 has a metering servo motor 110 disposed thereto. The metering servo motor 110 rotates injection shaft 105 through a belt 111.

In an injection molding machine having two injection drive mechanisms each driven by the two injection servo motors 107a and 107b, the two injection servo motors 107a and 107b must be synchronized with each other in an injection process. Accordingly, a main controller causes the two injection drive mechanisms to belong to the group which is subjected to a synchronous control in an injection process and can control them separately from the other drive mechanisms. As a result, since the load of the main controller can be reduced in the injection process, even a main controller having a low processing speed can sufficiently achieve a function.

Further, in a metering process, the synchronous control must be executed between the two injection servo motors 107a and 107b and between the two injection servo motors 107a and 107b and the metering rotation drive mechanism described above. Accordingly, the main controller can also cause the two injection drive mechanisms and the metering rotation drive mechanism to belong to the group which is subjected to the synchronous control and can control them separately from the other drive mechanisms. As a result, since the load of the main controller can be reduced in the metering process, even a main controller having a low processing speed can sufficiently achieve a function.

Figure 2:
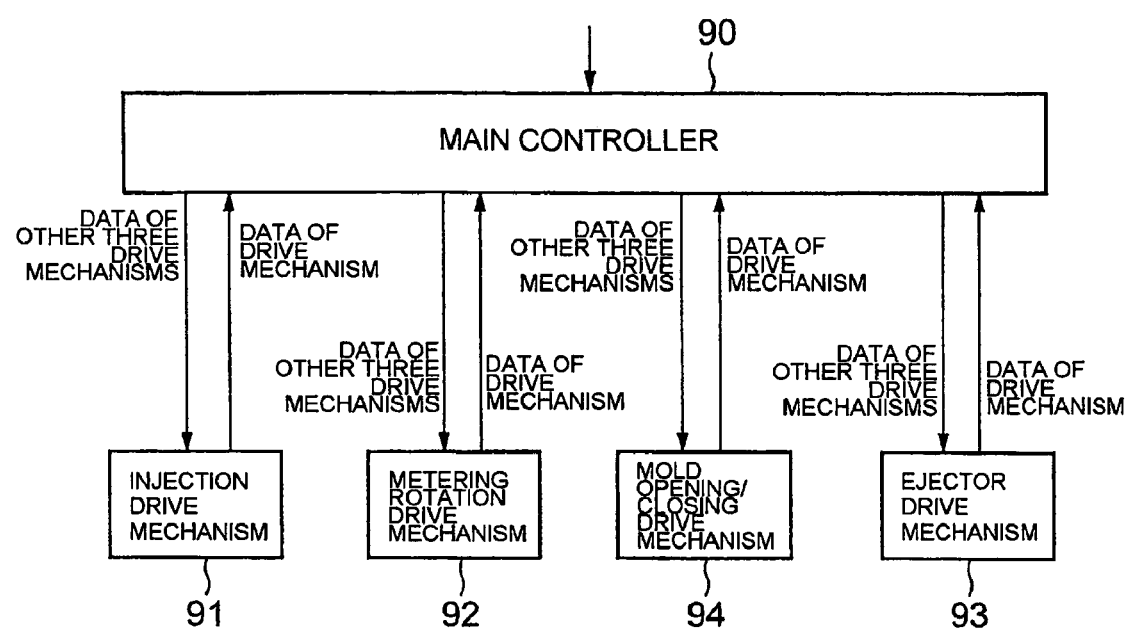
FIG. 2 is a block diagram showing an arrangement when a single main controller executes a synchronous control to a plurality of drive mechanisms shown in FIG. 1.
Figure 3:
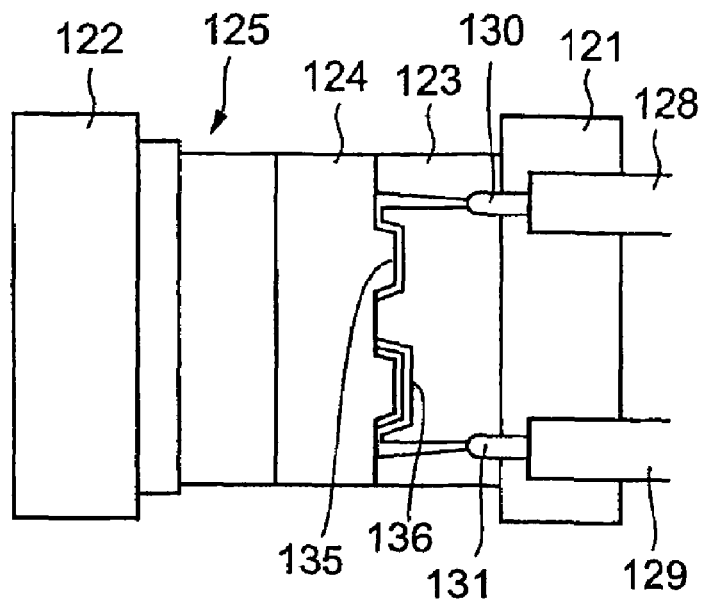
FIG. 3 is a view explaining a first manufacturing process of a two-material molding machine.
Figure 4:
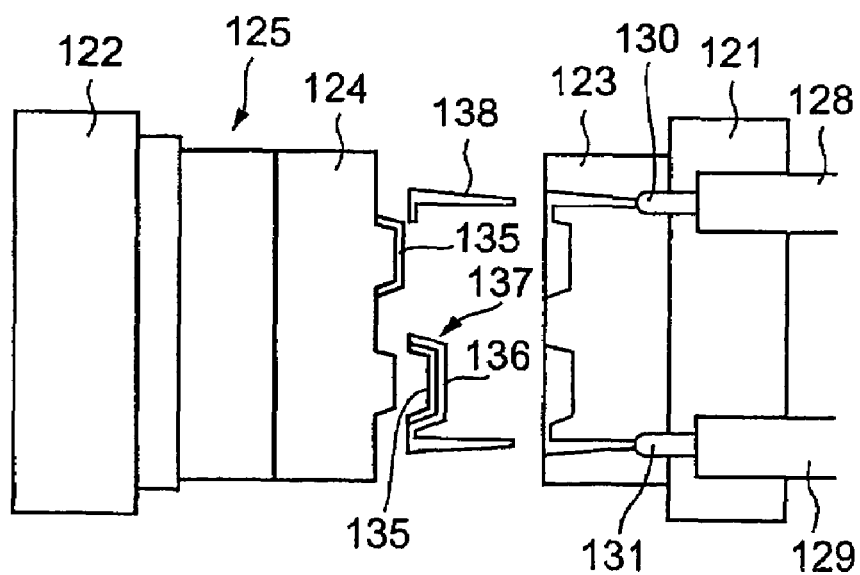
FIG. 4 is a view explaining a second manufacturing process of the two-material molding machine.
Figure 5:
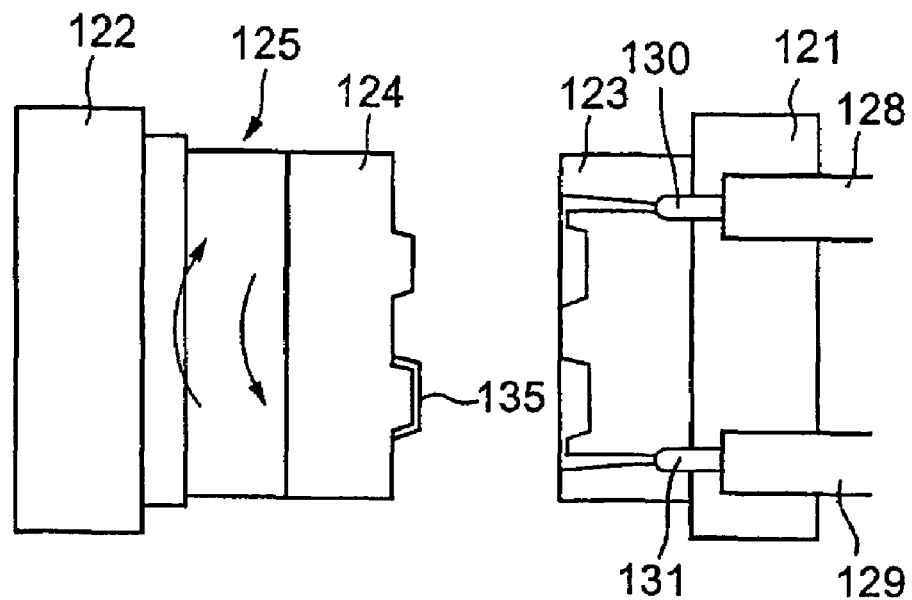
FIG. 5 is a view explaining a third manufacturing process of the two-material molding machine.
Figure 6:
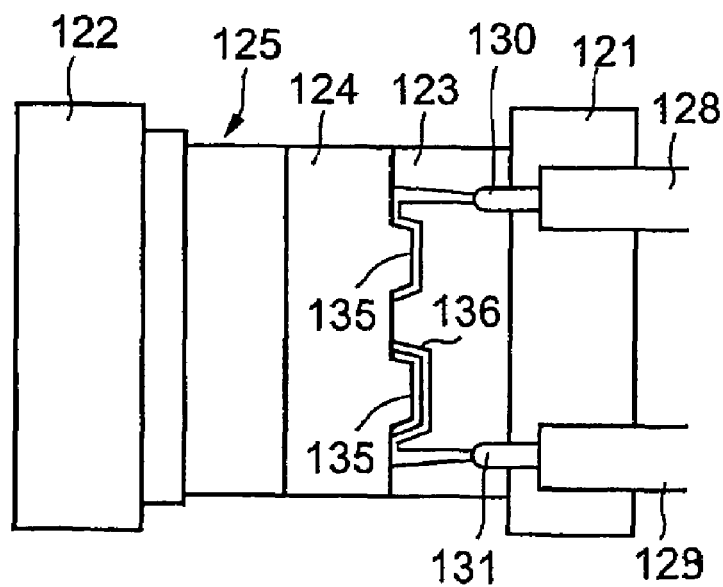
FIG. 6 is a view explaining a fourth manufacturing process of the two-material molding machine.
Figure 9:
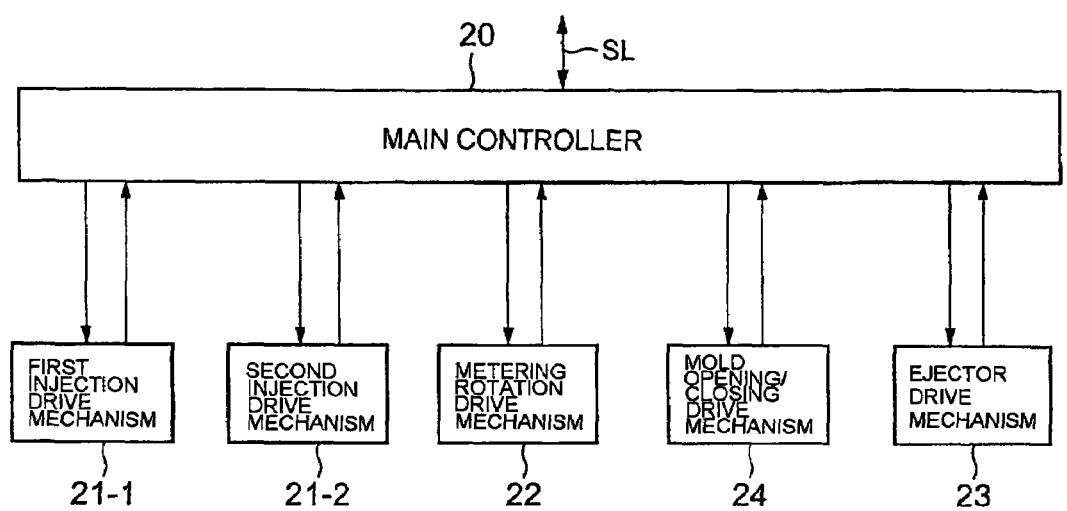
FIG. 9 is a block diagram showing the arrangement of a control system when the control method according to the present invention is applied to an injection molding machine having two injection drive mechanisms driven by two servo motors.

A sixth embodiment of the present invention will be explained with reference to FIG. 9. In the sixth embodiment, the control method according to the present invention is applied to the injection molding machine having the two injection drive mechanisms driven by the two servo motors described in FIGS. 8A and 8B. The injection molding machine includes a metering rotation drive mechanism 22, an ejector drive mechanism 23, and a mold opening/closing drive mechanism 24 as explained in FIG. 2, in addition to first and second injection drive mechanisms 21-1 and 21-2. A main controller 20 synchronizes among the first and second injection drive mechanisms 21-1 and 21-2 and the metering rotation drive mechanism 22 with one another in a metering process and an injection process. Although the main controller 20 also controls the ejector drive mechanism 23 and the mold opening/closing drive mechanism 24, it does not execute a synchronous control between the first and second injection drive mechanisms 21-1 and 21-2 and the metering rotation drive mechanism 22. In any case, the main controller 20 can control five-axis drive mechanisms at a four-axis processing speed which meets the performance of a conventional injection molding machine. Note that the embodiment may be combined with the second through fifth embodiments described above.

Figure 10:
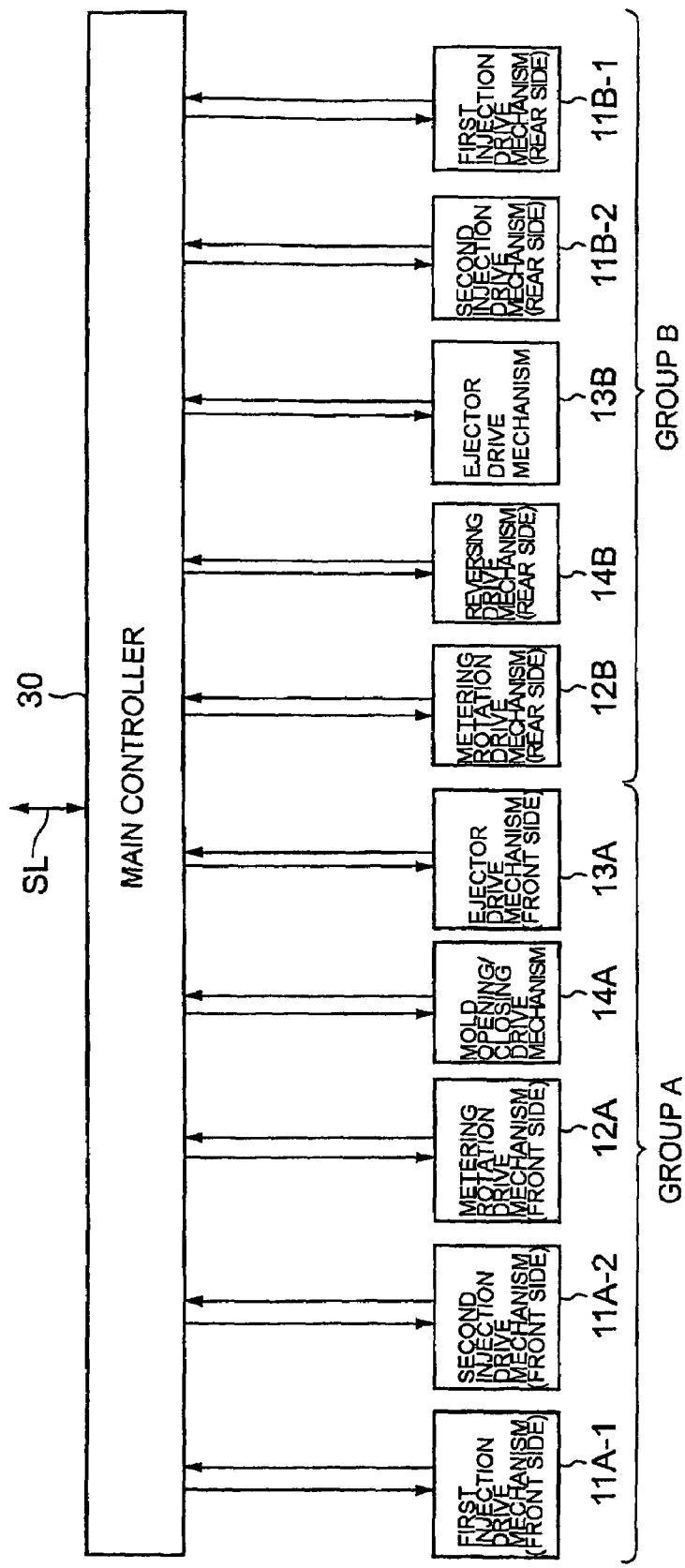
FIG. 10 is a block diagram showing the arrangement of a control system when the control method according to the present invention is applied to a two-material or two-color molding machine having two injection drive mechanisms driven by two servo motors.

A seventh embodiment of the present invention as a modification of the first embodiment will be explained with reference to FIG. 10. In the seventh embodiment, the control method according to the present invention is applied to the two-material or two-color molding machine having the two injection drive mechanisms driven by the two servo motors described in FIGS. 8A and 8B. The same portions as the components shown in FIG. 7 are denoted by the same reference numerals and the detailed description thereof is omitted. In the seventh embodiment, first and second injection drive mechanisms 11A-1 and 11A-2 are provided on a front side, and first and second injection drive mechanisms 11B-1 and 11B-2 are provided on a rear side. Ten drive mechanisms are also divided into two groups. That is, a group A is provided on the front side and includes the first and second injection drive mechanisms 11A-1 and 11A-2, a metering rotation drive mechanism 12A, an ejector drive mechanism 13A, and a mold opening/closing drive mechanism 14A. In contrast, a group B is provided on the rear side and includes the first and second injection drive mechanisms 11B-1 and 11B-2, a metering rotation drive mechanism 12B, an ejector drive mechanism 13B, and a reversing drive mechanism 14B.

In the embodiment, a main controller 30 executes a control so that the first and second injection drive mechanisms 11A-1 and 11A-2 are synchronized with the metering rotation drive mechanism 12A on the front side in a metering process and an injection process. In contrast, the main controller 30 executes a control so that the first and second injection drive mechanisms 11B-1 and 11B-2 are synchronized with the metering rotation drive mechanism 12B on the rear side in the metering process and the injection process. Although it is needless to say that the main controller 30 controls also the ejector drive mechanism 13A and the mold opening/closing drive mechanism 14A, it does not execute a synchronous control between the first and second injection drive mechanism 11A-1 and 11A-2 and the metering rotation drive mechanism 12A. In this case, as to, for example, the mold opening/closing drive mechanism 14A, it only transmits detected values to the main controller 30, and the main controller 30 only transmits a drive command signal to the mold opening/closing drive mechanism 14A. Likewise, although the main controller 30 controls, also the ejector drive mechanism 13B and the reversing drive mechanism 14B, it does not execute the synchronous control between the first and second injection drive mechanism 11B-1 and 11B-2 and the metering rotation drive mechanism 12B. In any case, the main controller 30 can control the ten-axis drive mechanisms at a four-axis processing speed which meets the performance of the two-material or two-color molding machine. Note that the embodiment may be combined with the second through fifth embodiments described above.

As explained above, according to the present invention, even multi-axis drive-mechanisms having more than five axes can be controlled by a single main controller having a four-axis processing speed which meets the performance of a molding machine without using a highly effective main controller.

The present invention can be applied to a motor-driven molding machine or a hybrid molding machine having drive mechanisms which must be synchronized with each other, in addition to the injection molding machine and the two-material or two-color molding machine.

While the present invention has thus far been described in connection with the preferred embodiment thereof, it will readily be possible for those skilled in the art to put this invention into practice in various other manners.

What is claimed is:

1. A control method of a molding machine that controls a group of drive mechanisms comprising a plurality of drive mechanisms driven by drive units, comprising:
   controlling with a single controller, in a predetermined process, at least two drive mechanisms constructing a group of synchronous drive mechanisms in the group of drive mechanisms while establishing synchronization among them by transmitting and receiving data of each of the at least two drive mechanisms to and from each other through the single controller; and
   controlling with the single controller the drive mechanisms except for the drive mechanisms in the group of synchronous drive mechanisms separately from the drive mechanisms in the group of synchronous drive mechanisms.

2. A control method of a molding machine according to claim 1, further comprising:
   providing four drive mechanisms of an injection drive mechanism, a metering rotation drive mechanism, a mold opening/closing drive mechanism, and an ejector drive mechanism and at least two other drive mechanisms as the plurality of drive mechanisms; and
   controlling the four drive mechanisms of the injection drive mechanism, the metering rotation drive mechanism, the mold opening/closing drive mechanism, and the ejector drive mechanism using the controller while establishing synchronization among them and controls the at least two other drive mechanisms while establishing synchronization among them.

3. A control method of a molding machine according to claim 1, wherein:
   the molding machine is a two-material or two-color molding machine, the control method further comprises:
   configuring the two-material or two-color molding machine to include injection drive mechanisms, metering rotation drive mechanisms, and ejector drive mechanisms on front and rear sides, respectively, and commonly includes a mold opening/closing drive mechanism and a reversing drive mechanism on the front and rear sides;
   controlling at least the injection drive mechanism on the front side and the metering rotation drive mechanism on the front side using the controller while establishing synchronization therebetween; and
   controlling at least the injection drive mechanism on the rear side and the metering rotation drive mechanism on the rear side using the controller while establishing synchronization therebetween.

4. A control method of a molding machine according to claim 3, further comprising:
   controlling the injection drive mechanism on the front side, the metering rotation drive mechanism on the front side, the ejector drive mechanism on the front side, and the mold opening/closing drive mechanism using the controller while establishing synchronization among them and controls the injection drive mechanism on the rear side, the metering rotation drive mechanism on the rear side, the ejector drive mechanism on the rear side, and the reversing drive mechanism while establishing synchronization among them.

5. A control method of a molding machine according to claim 1 wherein:
   the molding machine is an injection molding machine, and the injection molding machine includes an injection drive mechanism, a metering rotation drive mechanism, a mold opening/closing drive mechanism, and an ejector drive mechanism as the plurality of drive mechanisms, the control method further comprising:
   synchronizing the injection drive mechanism with the mold opening/closing drive mechanism using the controller as the plurality of drive mechanisms to be synchronized at least in an injection/compression process.

6. A control method of a molding machine according to claim 1, wherein:
   the molding machine is an injection molding machine, and the injection molding machine includes an injection drive mechanism, a metering rotation drive mechanism, a mold opening/closing drive mechanism, and an ejector drive mechanism as the plurality of drive mechanisms, the control method further comprising:
   when an eject pin is projected at least in an injection process, synchronizing the injection drive mechanism with the ejector drive mechanism using the controller as the plurality of drive mechanisms to be synchronized.

7. A control method of a molding machine according to claim 1, wherein:
   the molding machine is an injection molding machine, and the injection molding machine includes an injection drive mechanism, a metering rotation drive mechanism, a mold opening/closing drive mechanism, and an ejector drive mechanism as the plurality of drive mechanisms, the control method further comprising:
   when an eject pin is projected at least in a mold opening process, synchronizing the ejector drive mechanism with the mold opening/closing drive mechanism using the controller as the plurality of drive mechanisms to be synchronized.

8. A control method of a molding machine according to claim 1, wherein:
   the molding machine is an injection molding machine, and injection molding machine includes an injection drive mechanism, a metering rotation drive mechanism, a mold opening/closing drive mechanism, and an ejector drive mechanism as the plurality of drive mechanisms, the control method further comprising:
   synchronizing the injection drive mechanism with the mold opening/closing drive mechanism using the controller as the plurality of drive mechanisms to be synchronized in at least a metering process.

9. A control method of a molding machine according to claim 1, wherein:
the molding machine is an injection molding machine, and
the injection molding machine includes a plurality of injection drive mechanisms, a metering rotation drive mechanism, a mold opening/closing drive mechanism, and an ejector drive mechanism as the plurality of drive mechanisms, the control method further comprising:
synchronizing the plurality of injection drive mechanisms with each other using the controller as the plurality of drive mechanisms to be synchronized at least in an injection process.

10. A control method of a molding machine according to claim 9, further comprising:
synchronizing the plurality of injection drive mechanisms with the metering rotation drive mechanism as the plurality of drive mechanisms to be synchronized at least in a metering process.

11. A control method of a molding machine according to claim 3, further comprising:
driving the injection drive mechanisms on the front and rear sides by two servomotors, respectively;
controlling the two servo motors in the injection drive mechanism on at least the front side and the metering rotation drive mechanism on the front side using the controller while establishing synchronization among them; and
controlling the two servo motors in the injection drive mechanism on at least the rear side and the metering rotation drive mechanism on the rear side using the controller while synchronization among them.

12. A control method of a molding machine according to claim 1, wherein:
at least one group of the at least two groups includes the plurality of drive mechanisms to be synchronized, the control method further comprising:
controlling the at least two groups using the controller while establishing synchronization among the drive mechanisms included in the at least one group.

13. A control method of a molding machine according to claim 1, comprising:
dividing the plurality of drive mechanisms into a group of synchronous drive mechanisms to be synchronized in a predetermined process and other drive mechanisms; and
controlling the group of the synchronous drive mechanisms and the other drive mechanisms using the controller while synchronizing at least two drive mechanisms in the group of synchronous drive mechanisms.

14. A control method of a molding machine according to claim 1, wherein:
the molding machine is a two-material or two-color molding machine, and
the two-material or two-color molding machine includes injection drive mechanisms, metering rotation drive mechanisms, and ejector drive mechanisms provided on front and rear sides, respectively and includes a mold opening/closing drive mechanism and a reversing drive mechanism commonly provided on the front and rear sides, the control method further comprising:
controlling the injection drive mechanism on the front side, the metering rotation drive mechanism on the front side, and the ejector drive mechanism on the front side using the controller while establishing synchronization among them; and
controlling the injection drive mechanism on the rear side, the metering rotation drive mechanism on the rear side, and the ejector drive mechanism on the rear side using the controller while establishing synchronization among them.

15. A control method of a molding machine according to claim 1, wherein:
the molding machine is an injection molding machine having an injection drive mechanism, a metering rotation drive mechanism, a mold opening/closing drive mechanism, and an ejector drive mechanism, and
the group of the synchronous drive mechanisms comprises the injection drive mechanism and the metering rotation drive mechanism in at least a metering process.

16. A control method of a molding machine according to claim 1, wherein
the molding machine is an injection molding machine having an injection drive mechanism, a metering rotation drive mechanism, a mold opening/closing drive mechanism, and an ejector drive mechanism, and
the group of the synchronous drive mechanisms comprises the injection drive mechanism and the mold opening/closing drive mechanism in at least an opening/closing drive mechanism in at least an injection/compression process.

17. A control method of a molding machine according to claim 1, wherein:
the molding machine is an injection molding machine having an injection drive mechanism, a metering rotation drive mechanism, a mold opening/closing drive mechanism, and an ejector drive mechanism, and
the group of the synchronous drive mechanisms comprises the injection drive mechanism and the ejector drive mechanism in at least an injection process.

18. A control method of a molding machine according to claim 1, wherein:
the molding machine is an injection molding machine having an injection drive mechanism, a metering rotation drive mechanism, a mold opening/closing drive mechanism, and an ejector drive mechanism, and
the group of the synchronous drive mechanisms comprises mold opening/closing drive mechanism and the ejector drive mechanism in at least a mold opening process.

19. A control method of a molding machine according to claim 1, wherein:
the molding machine is an injection molding machine having a plurality of injection drive mechanisms, a metering rotation drive mechanism, a mold opening/closing drive mechanism, and an ejector drive mechanism, and
the group of the synchronous drive mechanisms comprises the plurality injection drive mechanism in at least an injection process.

20. A control method of a molding machine according to claim 1, further comprising:
controlling with the single controller, in a process different from the predetermined process, another group of synchronous drive mechanisms comprising at least two other drive mechanisms except for the group of synchronous drive mechanisms while establishing synchronization among them and separately from the group of synchronous drive mechanisms.

* * * * *